F. W. MUELLER.
CAMERA.
APPLICATION FILED AUG. 14, 1916.
1,252,829.
Patented Jan. 8, 1918.
6 SHEETS—SHEET 1.
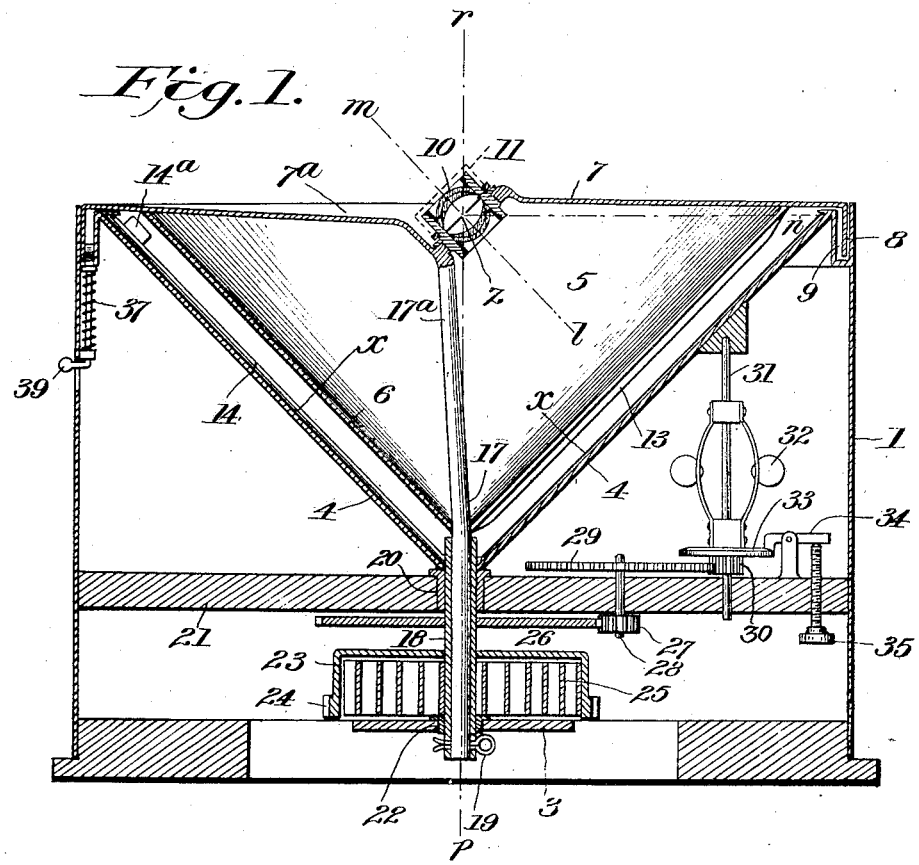
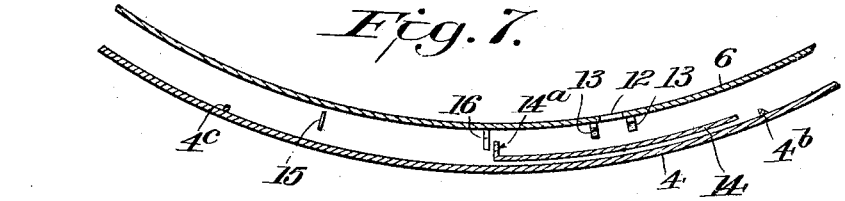
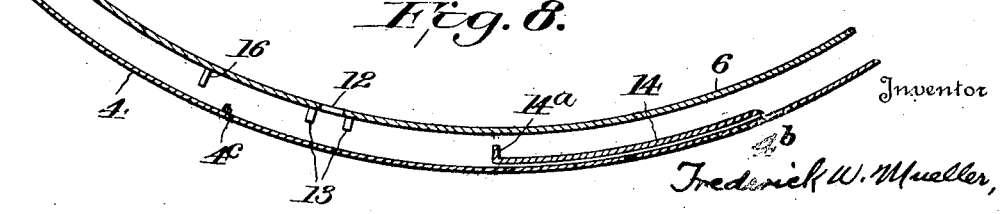
Inventor
Frederick W. Mueller,
By Watson & Boyden,
Attorneys

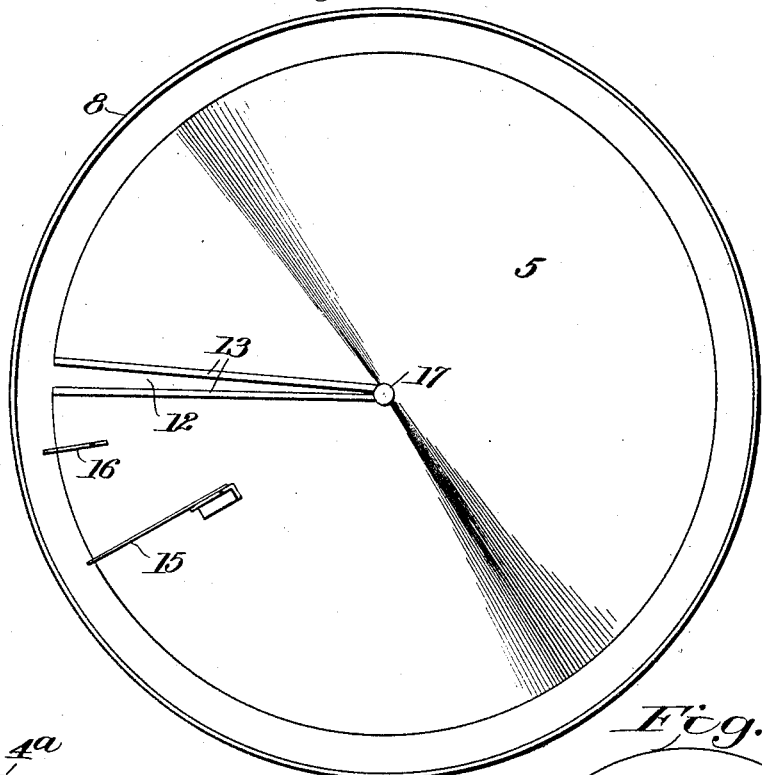
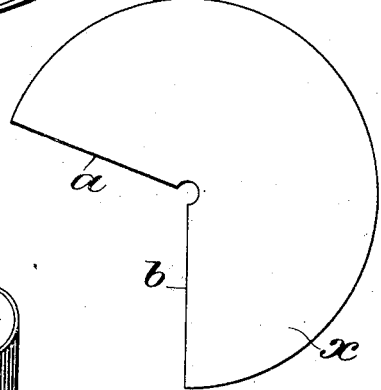
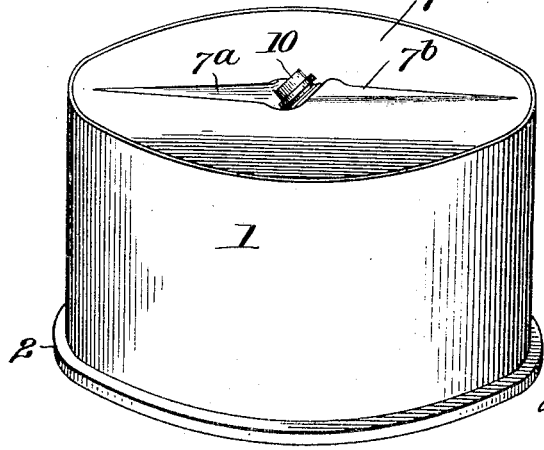

F. W. MUELLER.
CAMERA.
APPLICATION FILED AUG. 14, 1916.
1,252,829.
Patented Jan. 8, 1918.
6 SHEETS—SHEET 3.
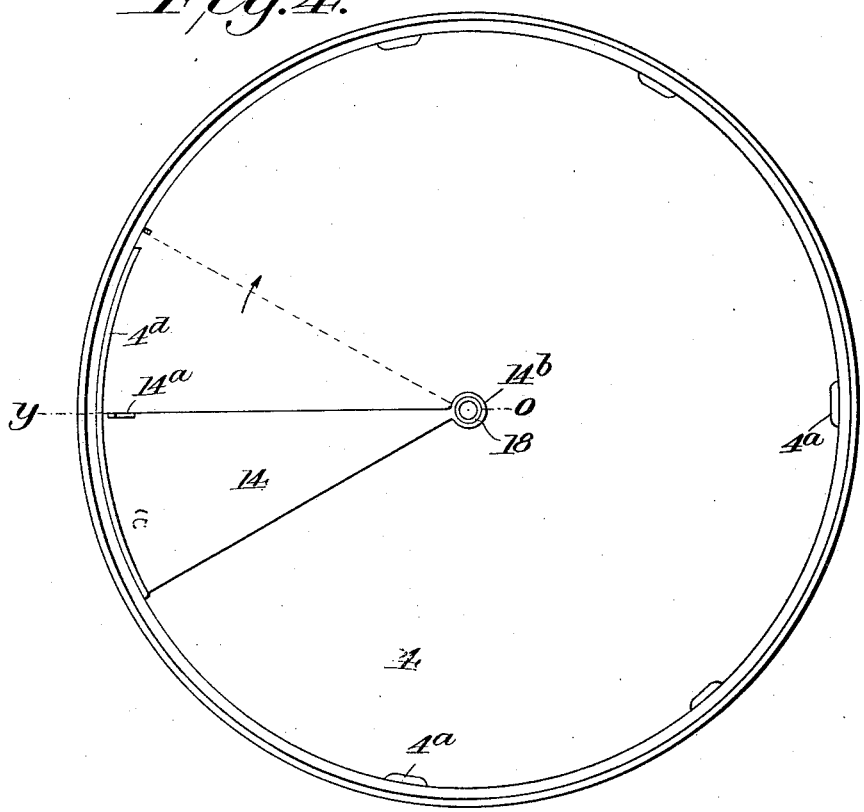
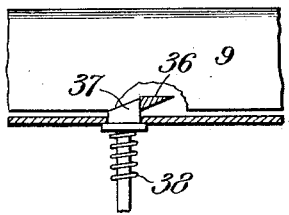
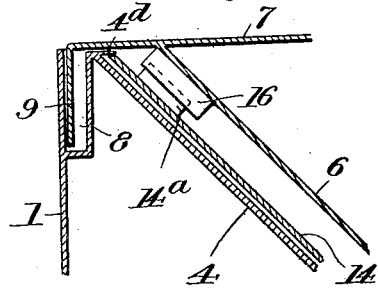
Inventor
Frederick W. Mueller
By Watson & Boyden,
Attorneys

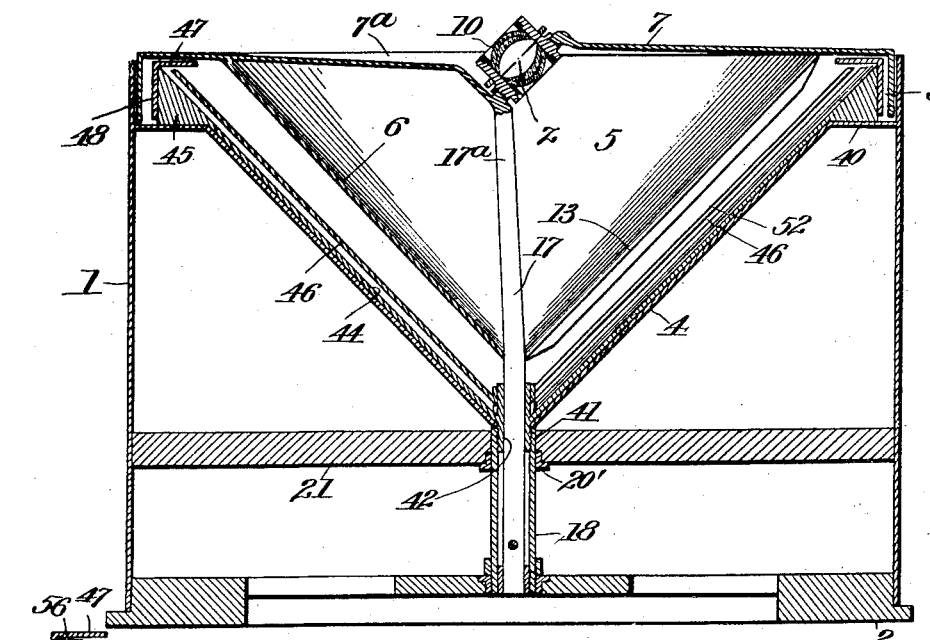
Fig. 9.
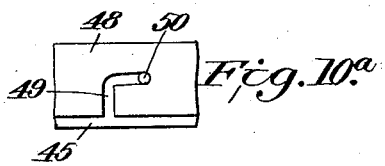
Fig. 10.    Fig. 10.ᵃ
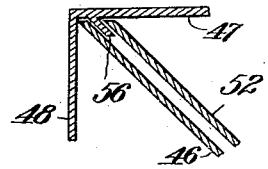
Fig. 10.ᵇ
Fig. 11.
Inventor
Frederick W. Mueller,
by Watson & Boyden,
Attorneys

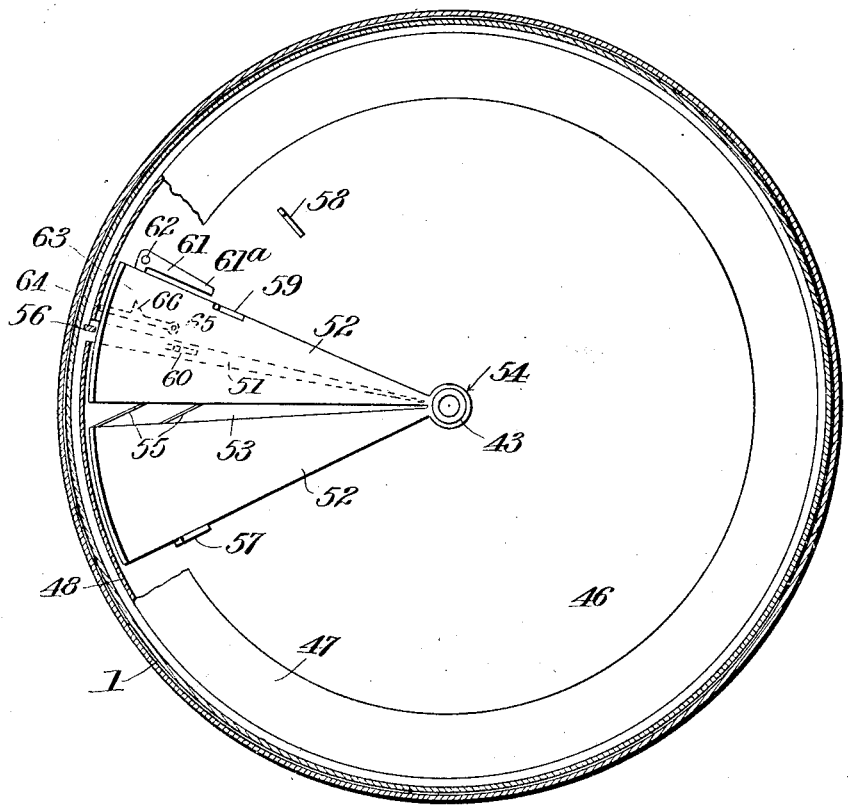
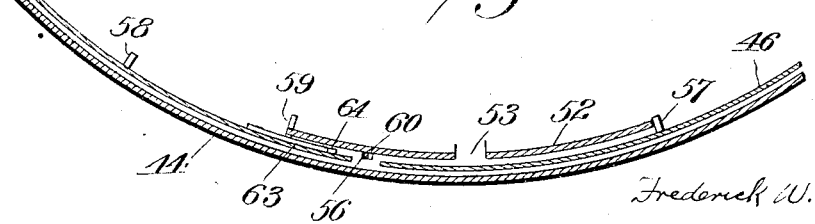

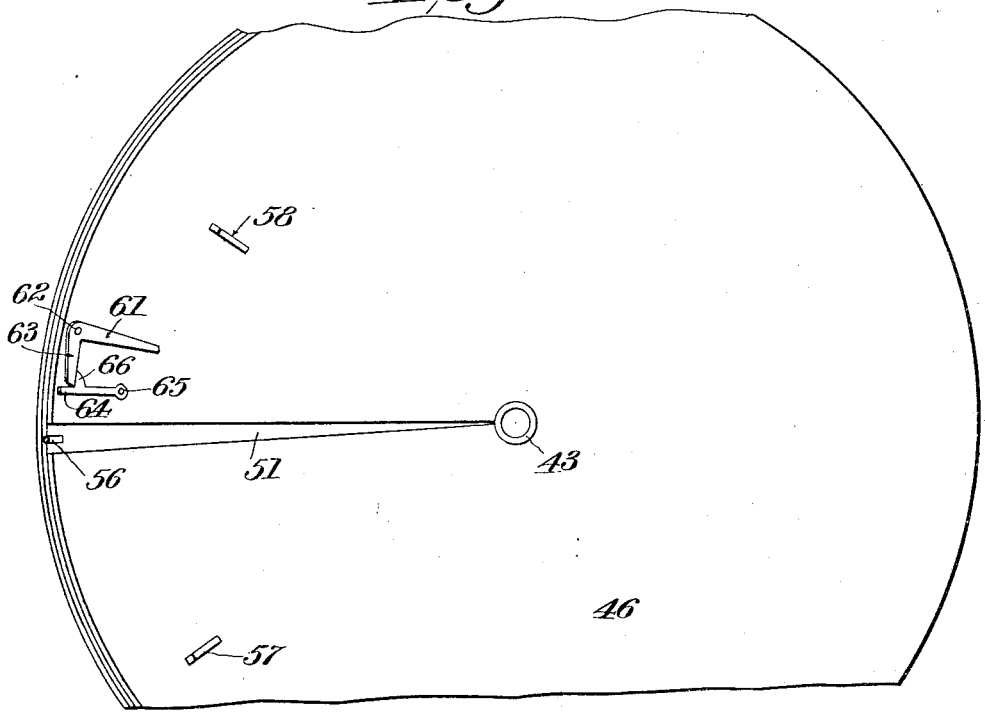
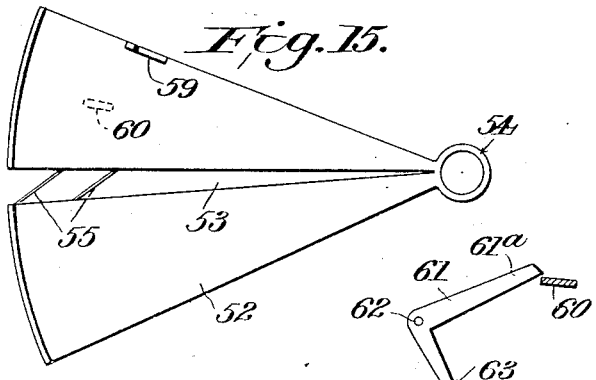
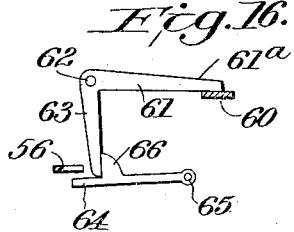

UNITED STATES PATENT OFFICE.

FREDERICK W. MUELLER, OF BALTIMORE, MARYLAND.

CAMERA.

1,252,829.  Specification of Letters Patent.  Patented Jan. 8, 1918.

Application filed August 14, 1916. Serial No. 114,826.

*To all whom it may concern:*

Be it known that I, FREDERICK W. MUELLER, a citizen of the United States, residing at Baltimore, in the State of Maryland, have invented certain new and useful Improvements in Cameras, of which the following is a specification.

This invention relates to cameras, and more particularly to cameras of that type in which the lens moves during exposure so as to cover a wider field.

Among the objects of the invention is to provide a camera of this character which shall be capable of photographing upon a continuous, sensitized surface the entire sweep of the horizon at a single exposure. When the camera rests upon a horizontal support, it is so constructed as to reproduce the entire dome of the sky from the horizon to the zenith. When inverted and suspended, as from a flying machine, it serves to photograph the entire landscape on all sides of the position at which it is located, the picture extending from the horizon to a point immediately below the camera's position, thus covering the whole field of vision.

Another object of the invention is to so position the film or sensitized surface in regard to the lens that objects appearing upon the picture will be shown in their true relative positions and so that by applying a suitable scale to the surface of the picture the accurate distances of such objects can be determined.

To this end, the invention consists in arranging the sensitized surface in the form of a cone of revolution, with the lens disposed with its optical center in the axis of such cone. The cone which I employ is a right cone, with its elements extending at an angle of 45° to the axis. The lens itself is arranged with its optical axis at an angle of 45° to the axis of the cone, whereby such optical axis is perpendicular to an element of the cone.

In order that the invention may be clearly understood, reference is had to the accompanying drawings forming part of this specification, and in which, Figure 1 is a central vertical section through the simplest form of my improved camera;

Fig. 2 is an inverted plan view of the hollow cone forming a focal plane shutter;

Fig. 2ª is a detail showing the means for positioning the film;

Fig. 3 is a perspective view on a smaller scale, showing the appearance of the exterior of the camera;

Fig. 3ª is a plan view of the film used in my improved camera;

Fig. 4 is a plan view with the top of the camera and shutter removed, looking down into the film chamber;

Fig. 5 is a detailed side elevation showing the latch used in making an exposure;

Fig. 6 is a detailed section showing the means for operating the shield or auxiliary shutter hereinafter described;

Figs. 7 and 8 are fragmentary top plan views on an enlarged scale, showing the focal plane shutter and auxiliary shutter, and illustrating different positions of the parts;

Fig. 9 is a view similar to Fig. 1, showing a slightly modified form of camera in which a removable film holder is employed;

Fig. 10 is a sectional view through a part of such film holder, also showing the retaining means therefor;

Fig. 10ª is a detail showing the method of locking such retaining means in position;

Fig. 10ᵇ is a detailed section on an enlarged scale, showing a portion of the said retaining means and associated parts;

Fig. 11 is a fragmentary plan view similar to Figs. 7 and 8, illustrating the arrangement of parts constituting the film holder and shutters;

Fig. 12 is a plan view of the camera with the cover removed, showing the film holder, auxiliary shutter and associated parts;

Fig. 13 is a view similar to Fig. 11, showing the parts in different positions;

Fig. 14 is a fragmentary plan view of the film holder itself, the auxiliary shutter being omitted;

Fig. 15 is a plan view of the auxiliary shutter alone; and,

Figs. 16 and 17 are plan views of the special latch and release mechanism for the auxiliary shutter used in connection with the film holder, the parts being shown in different positions in the two figures.

Referring to the drawings in detail, and particularly to Figs. 1 to 8 thereof, my improved camera comprises a box or casing 1, which is preferably cylindrical, as shown. This has a suitable bottom 2, having an opening therein, across which opening extends a bar 3, access being had to the interior of the casing through such opening on each side of said bar. This is to enable the spring drum hereinafter described to be grasped by the operator so as to wind the spring. However, in practice, other means for winding the spring may be provided.

In the upper part of the casing is formed a chamber having a conical bottom 4, which bottom serves as the film support. The film x, which consists of a flat, circular disk with a sector cut away, as shown in Fig. 3ª, is laid around the inside of the conical support 4 with its upper edge engaged under lugs 4ª, as clearly shown in Fig. 2ª, and with the edges a and b thereof abutting or slightly overlapping.

Fitting in the conical chamber above mentioned is a hollow inverted, cone-shaped structure 5, formed of sheet metal or the like. This structure has a conical surface 6, conforming to the shape of the film support 4 and spaced slightly therefrom, and is provided with a top 7, as shown in Fig. 1. This top is extended beyond the structure 5, so as to form a closure for the film chamber, the edges of the top 7 being turned down to form a depending annular flange 9. This flange fits into a similarly shaped annular groove 8, formed around the inside of the upper edge of the casing 1. This flange and groove arrangement forms a light-tight joint so as to protect the film.

The lens 10, which is preferably of the symmetrical double achromatic type commonly used in photography, is mounted at the center of the top 7, with its optical center z in the axis p—r of the conical film support 4. The center z of the lens is also located on the horizontal line z—n which passes through the upper edge of the film x. The lens is set at such an angle that its optical axis l—m is perpendicular to an element of the film support 4. Since this film support is a right cone, it follows that the optical axis of the lens is inclined 45° to the horizontal. A cap 11 may be placed over the lens tube when not in use.

In order to facilitate setting the lens at the angle indicated, and in order to insure a free and unobstructed sweep of the horizon, the top 7 is preferably provided with a groove or depression 7ª in front of the lens and with a corresponding ridge 7ᵇ behind it. See Fig. 3.

The conical wall 6 is provided, at a point directly opposite the lens 10 and in the optical axis thereof, with a slot 12. As clearly shown in Fig. 2, this slot is triangular in form, tapering from its maximum width at the upper edge of the cone to a point at the center thereof, so that the edges of this slot constitute true elements of the conical surface. On each side of the slot preferably extend ribs 13, which project close to the surface of the film and tend to prevent the spreading of light passing through the slot 12. The conical surface 6 and slot 12 constitute an arrangement in the nature of a focal plane shutter, as will be readily understood.

In order to protect the film from light entering the lens after the cap has been removed and before it is desired to make an exposure, I provide an auxiliary shutter or shield 14. This is in the shape of a sector of a cone, as clearly shown in Fig. 4, and is provided at its smaller end with a ring or loop 14ᵇ, which fits loosely over a central shaft 18, hereinafter described. The shield 14 is provided near its wide end and at one edge with an upstanding lug 14ª. The wide end of the shield 14 slides freely in a curved guide 4ᵈ, formed around the upper edge of the conical support 4. This guide is of a length approximately twice the width of the shield 14, and stops are provided at its ends to limit the movements of the shield.

To the underside of the conical surface 6 are secured a flexible leaf spring 15, extending parallel with the surface of the cone, and a rigid stop or lug 16, as clearly shown in Fig. 2. This spring and lug are so positioned as to engage the lug 14ª on the shield 14 in a manner hereinafter described.

The conical member 5 and its associated parts are rigidly mounted upon a central shaft 17 which coincides with the axis of the cones 4 and 6, and the upper end of which is offset laterally, as indicated at 17ª, so as not to interfere with the proper projection of the image by the lens 10. The lower end of the shaft 17 passes loosely through a hollow shaft or sleeve 18, which projects up slightly above the conical support 4 and extends down through the bottom 2. This shaft is journaled in suitable bushings 20 and 22, carried by a bar 21 and the bar 3, respectively. The shafts 17 and 18 are secured together at their lower ends by means of a cotter pin 19, or the like.

Loosely journaled on the shaft 18, inside of the casing 1, is a spring drum 23, having on its outer surface ratchet teeth 24, adapted to be engaged by a spring pressed pawl (not shown), and thus held against rotation. Inside of the drum 23 is a coiled spring 25, having one end attached to the drum and the other end attached to the shaft 18. Secured to the shaft 18, is a relatively large gear wheel 26, which meshes with a pinion 27, carried by a shaft 28, journaled in the bar 21, to the upper end of which shaft is secured a relatively large gear wheel 29, which meshes with a pinion 30, secured to a shaft 31. This shaft is rotatably mounted in suitable bearings and carries a centrifugal governor 32, to the lower end of which is attached a braking disk 33. On this disk bears a brake shoe 34, the position of which can be regulated by means of a thumb screw 35, set into the bar 21. The arrangement above described constitutes a well known speed regulating device for governing the timing of the exposure, and it will be understood that any other suitable timing mechanism may be employed without departing from the spirit of my invention.

A lug 36 is secured to the member 5 and may conveniently be located on the inside of the flange 9 (see Fig. 5). This lug is normally engaged by a latch 37, which holds the member 5 against rotation. A spring 38 normally maintains the latch in operative position, and a knob or button 39, disposed on the outside of the casing 1, is provided for withdrawing the latch out of the path of the lug 36.

The operation of the invention so far described may be briefly stated as follows.

A suitable film having been placed in position on the conical support 4, and the spring 25 having been wound, the camera is ready for operation. It will be understood that the shield 14 or auxiliary shutter is normally disposed immediately beneath the slot 12, so as to protect the film from light entering said slot, the position of the parts being as indicated in Fig. 7. When it is desired to make an exposure, the operator depresses the button 39, and thus releases the member 5. The tension of the spring then causes the member 5 to revolve, and immediately afterward the slot 12 moves past the edge of the shield 14 and the exposure begins. The movement continues until the member 5 has made a complete revolution, such movement being retarded by means of the centrifugal governor and brake, or other suitable timing device. During this movement, the entire horizon is presented to the lens and the slot 12 sweeps over the entire surface of the film $x$, thus impressing upon such film the images projected by the lens.

As the revolution of the member 5 nears its completion, the leaf spring 15 engages the lug 14$^a$ and shifts the shield 14 from the position shown in full lines in Fig. 4 to that indicated in dotted lines. This movement covers up part of the film which has already been exposed and uncovers that portion which was formerly protected by the shield. In other words, the exposure began at the line $o$—$y$ in Fig. 4, and progressed in the direction of the arrow. The arrangement is such that the movement of the shield from full line to dotted line position is exactly equal to the width of the shield. Therefore, since one edge of the shield coincides with the line $o$—$y$, when in its initial position, the other edge coincides with such line after the shield has been shifted. After such shifting has taken place, as above described, the rotation continues until the lug 16 comes up against the lug 14$^a$. This brings the slot 12 over the shield again and the rotating member 5 is stopped in this position by reason of the fact that the shield can move no farther. It will thus be seen that the exposure begins at the line $o$—$y$ and finishes exactly at this same line, thereby avoiding any overlapping.

Fig. 7 shows the normal position of the parts before the rotation begins, and Fig. 8 shows the position of the parts just after the exposure has begun.

With the arrangement above described, it is necessary to load the camera in a dark room. That is to say, it is impossible to change the film when out in the field. In order to enable the operator to take a number of pictures while out on a single trip and without the necessity of using a dark room to re-load, I have designed a film holder. This will now be described, particular reference being had to Figs. 9 to 17 of the drawings. In these figures the same reference characters have been used as far as possible to designate the parts corresponding to those shown in Figs. 1 to 8.

Referring to Figs. 9 and 10, instead of laying the film directly upon the cone 4, I propose to employ a removable conical film holder such as shown in Fig. 10. This film holder consists of a conical base 44, formed of sheet metal or the like, and integrally united at its center to the sleeve or nipple 43. This nipple projects both inside and outside of the base 44, and the outside portion is screw-threaded as shown at 42.

In this construction, instead of extending the conical support 4 up to the top of the casing 1, I provide a flat annular rim 40, as shown in Fig. 9. Also, at the center of the support 4, is formed a screw-threaded thimble or socket 41, adapted to receive the threaded nipple 42, of the film holder. Around the outer edge of the base 44 of the film holder extends a thickened rim 45, which preferably has a flat under surface adapted to seat upon the rim 40 when the parts are assembled, as shown in Fig. 9. From the above explanation it will therefore be understood that the parts 42—43—44 and 45 of the film holder are removable from the camera for re-loading, but are held fixed therein during any given operation.

It will be clear that the film is carried upon the base 44 of the film holder instead of upon the support 4, but the film holder itself rests upon the support 4. In other words, the base 44 is merely interposed between the film and the support 4.

Co-extensive with the base 44 of the film holder and nested within the same is a cover 46. This cover is held in position on the base 44 by means of an angular locking ring comprising the flanges 47 and 48. This ring fits down snugly around the rim 45, and may be secured thereto by a pin and slot connection, as indicated at 49 and 50, (see Fig. 10$^a$) similar to a bayonet joint. Two or more of such pins 50 may be employed. The cover 46 is provided with a triangular slot 51 (see Fig. 14) similar to the slot 12 in the member 5.

Superposed upon the cover 46 is an auxiliary shutter 52. This is shaped like a sector (see Fig. 15) and is provided at its smaller end with a ring or loop 54, which fits loosely around the nipple 43. This auxiliary shutter 52 is provided throughout its middle with a triangular slot 53, as clearly shown in Fig. 15. This slot would, of course, divide the shutter entirely into two parts, so that in order to render these parts rigid with each other it is necessary to unite them by braces 55. These are in the nature of fine wires and are preferably diagonally disposed, as shown.

A stop lug 56 is rigidly secured to the flange 47 of the locking ring and projects downwardly and inwardly at an angle, as clearly shown in Figs. 10 and 10[b], this lug being so disposed that the edge of the cover 46 fits snugly under the same. In other words, the lug is positioned between the cover 46 and the auxiliary shutter 52.

Referring to Figs. 12 and 14, it will be seen that on the outside of the cover 46 I provide a pair of lugs 57 and 58, spaced apart a distance approximately equal to one and a half times the width of the auxiliary shutter 52 at that point. A lug 59 is also secured to one edge of the shutter 52 and projects slightly both above and below the same, as shown in Fig. 11. This lug is so positioned as to engage the stop 58. By making the stop 58 higher, it is unnecessary for the lug 59 to project below the shutter 52.

The shutter 52 also carries a lug 60, projecting downwardly from the inner surface thereof, (see Figs. 12 and 13), such lug being located at a greater distance from the center 43 than is the lug 59.

Mounted on the cover 46 is latch mechanism, more clearly shown in Figs. 16 and 17. This mechanism consists of a bell crank lever 61, pivoted at 62 and having one arm 61[a] arranged in the path of the lug 60. The other arm 63 is adapted to be engaged by a latch 66, carried by a lever 64, pivoted at 65. It will be noted particularly that the lug 56 is disposed in the path of the outer end of lever 64 so as to engage and swing such lever, as indicated in Fig. 17, thus tripping the latch 66 out of engagement with the bell crank 61.

This mechanism will be best understood from the following description of the operation of this form of my invention.

It will be understood that a plurality of film holders, such as shown in Fig. 10, are provided. A film is placed in each holder and the cover secured in position by means of the locking ring above described, the auxiliary shutter 52 being so disposed that the slot 53 therein is closed by the underlying portion of the cover 46, while the slot 51 in such cover is closed by the overlying portion of the shutter 52, as shown in Fig. 13.

One of these film holders, so loaded, is placed in the camera by screwing the nipple 42 into the socket 41, and the member 5 constituting a closure for the film chamber is placed in position, as shown in Fig. 9. It will, of course, be understood that the same driving and timing mechanism shown in Fig. 1 is employed in the device illustrated in Fig. 9 the only difference being that a slightly modified form of bushing 20' is provided, in which the shaft 18 is journaled. When rotation of the lens and associated parts begins, the lug 16 carried by the conical surface 6, first engages the lug 59, the parts being so proportioned that when this occurs the slot 12 registers with the slot 53. Further movement of the rotating parts results in shifting the shutter 52 from the position shown in Fig. 13 to that illustrated in Fig. 11, in which position the slot 51 is brought into alinement with the other two slots. Further movement of the shutter 52, relative to the cover 46, is prevented at this time by reason of the fact that the lug 60 bears against the tail 61[a] of the bell crank lever 61, as shown in Fig. 16, such lever being rigidly held by means of the latch 66. As the rotation continues, therefore, the shutter 52 and cover 46 are carried around together, the slots 12, 51, and 53, being maintained in alinement and the film being exposed through these slots as the lens revolves. It will be understood that in its initial position the lug 56 is on the right hand side of the lever 64, as viewed in Fig. 13, the movement described above being assumed to progress toward the left.

When the revolution of the lens and associated parts has been nearly completed, the lever 64 is carried past the fixed lug 56 and is tripped thereby, as shown in Fig. 17, thus withdrawing the latch 66 from underneath the arm 63 of the bell crank lever 61. This lever 61, therefore, becomes free to rock upon its pivot and is pushed around by the lug 60, thus permitting the shutter 52 to over-run the cover 46. This over-running movement continues until the lug 59 comes up against the lug 58, and when this occurs, the shutter 52 is arrested in such a position that the slots 51 and 53 are closed, as will be obvious.

In other words, the shutter 52 is normally in the position shown in Fig. 12 with one of its halves covering the slot 51. The initial movement which brings the lug 60 into engagement with the bell crank lever 61 results in bringing the slots 51 and 53 into alinement, and the final movement, after the lug 60 has cleared the bell crank lever 61, results in shifting the shutter so that its other half covers the slot 51. It will be understood, of course, that the lug 59 is so disposed as to clear the end 61ᵃ of the lever 61.

What I claim is:

1. In a camera, a cone-shaped film support, and a lens having its optical center disposed in the axis of the cone, and adapted to project an image on the film carried by said support.

2. In a camera, a cone-shaped film support, and a lens having its optical center disposed in the axis of the cone and its optical axis perpendicular to an element of the cone.

3. In a camera, a film support in the shape of a right cone, and a lens having its optical center disposed in the axis thereof, and adapted to project an image on the film carried by said support.

4. In a camera, a cone-shaped film support, a lens having its optical center disposed in the axis thereof and adapted to project an image on the film carried by said support, and means for revolving said lens about such axis.

5. In a camera, a cone-shaped film support, a lens having its optical center disposed in the axis thereof and adapted to project an image on the film carried by said support, and a shutter movable between said support and lens and having a triangular slot.

6. In a camera, a cone-shaped film support, a lens having its optical center in the axis thereof and adapted to project an image on the film carried by said support, a focal plane shutter, and means for revolving said lens and shutter simultaneously about such axis.

7. In a camera, a cone-shaped film support, a lens having its optical center disposed in the axis thereof and adapted to project an image on the film carried by said support, a conical shutter conforming to the shape of said film support and having a slot through which the film is exposed, and means for rotating said shutter about its axis.

8. In a camera, a cone-shaped film support, a lens having its optical center disposed in the axis thereof, a conical shutter having a slot therein, and means for rotating said lens and shutter about said axis.

9. In a camera, a chamber having a conical bottom adapted to support a film, a hollow, cone-shaped structure rotatably mounted in said chamber and having a top constituting a closure therefor, said hollow structure having a slot in its inner wall, and a lens centrally mounted in said top and arranged to project an image through said slot.

10. In a camera, a cone-shaped film support, a lens having its optical center mounted in the axis thereof, a conical focal plane shutter having a slot through which the image is projected by said lens, an auxiliary shutter or shield interposed between said slot and film support, and means for rotating said focal plane shutter and lens about said axis.

11. In a camera, a cone-shaped film support, a lens having its optical center mounted in the axis thereof, a conical focal plane shutter having a slot through which the image is projected by said lens, an auxiliary shutter or shield interposed between said slot and film support, means for rotating said focal plane shutter and lens about said axis, and means operated by the movement of said focal plane shutter for shifting said shield.

12. In a camera, a cone-shaped film support, a lens having its optical center mounted in the axis thereof, a conical focal plane shutter having a slot through which the image is projected by said lens, an auxiliary shutter or shield interposed between said slot and film support, means for rotating said focal plane shutter and lens about said axis, and means for automatically shifting said shield as said focal plane shutter completes one revolution.

13. A camera comprising a cylindrical casing, a chamber in the upper part thereof having a cone-shaped bottom adapted to support a film, a conical hollow member rotatably mounted in said chamber, and having a top constituting a closure therefor, a lens set in the center of said top and adapted to project an image on the film carried by said bottom, and a shaft to which said structure is rigidly secured, said shaft extending centrally through said casing.

14. A camera comprising a cylindrical casing, a chamber in the upper part thereof having a cone-shaped bottom adapted to support a film, a conical hollow member rotatably mounted in said chamber, and having a top constituting a closure therefor, a lens set in the center of said top and adapted to project an image on the film carried by said bottom, a shaft to which said hollow member is rigidly secured, and driving means located in said casing below said conical bottom for rotating said shaft.

15. A camera comprising a casing, a removable conical film holder fitting within said casing and a lens mounted with its optical center in the axis of such cone, and adapted to project an image on the film carried by said holder.

16. A camera comprising a casing, a removable conical film holder fitting within said casing, said film holder having a fixed base and a rotatable cover nested therein, said cover having a radial slot, a lens mounted with its optical center in the axis of the cone and adapted to project an image on the film carried by said holder, and means for rotating said lens and cover together.

17. A camera comprising a casing, a removable conical film holder fitting within said casing, said film holder having a fixed base and a rotatable cover nested therein, said cover having a slot, a lens arranged to project an image through such slot, and means for rotating said lens and cover about the axis of the latter.

18. A camera comprising a casing, a removable conical film holder fitting within said casing, said film holder having a fixed base and a rotatable cover nested therein, said cover having a slot, a shutter for normally closing said slot, a lens for projecting an image through said slot when uncovered, and means for rotating said lens and cover.

19. In a camera, a film holder comprising a base, means for fixing such base to the camera, a rotatable cover for said holder circular in outline and having a sector shaped slot, and means for rotating said cover so as to cause said slot to travel over the entire surface of said film.

20. In a camera, a film holder comprising a base, means for fixing such base to the camera, a rotatable cover for said holder having a slot, a shutter normally closing said slot, means for shifting said shutter to uncover said slot and for rotating said cover, and a lens arranged to project an image through said slot.

21. In a camera, a film holder comprising a base and cover, circular in outline, and spaced to receive the film between them, said cover being rotatable about its center, and provided with a radial slot, a focal plane shutter having a similar slot adapted to register with said first named slot, and an auxiliary shutter disposed between said focal plane shutter and said cover, and arranged to close the slot in the latter at times.

22. In a camera, a film support, circular in outline, a lens in operative relation thereto, a focal plane shutter rotatable about the axis of said film support and having a radial slot through which the image is projected by said lens, an auxiliary shutter arranged to close said slot, and means for rotating said focal plane shutter.

23. In a camera, a film support, circular in outline, a lens in operative relation thereto, a focal plane shutter rotatable about the axis of said film support and having a radial slot through which the image is projected by said lens, an auxiliary shutter interposed between said slot and film support, and means for rotating said focal plane shutter.

24. In a camera, a film support, circular in outline, a lens in operative relation thereto, a focal plane shutter rotatable about the axis of said film support and having a radial slot through which the image is projected by said lens, an auxiliary shutter interposed between said slot and film support, means for rotating said focal plane shutter, and means operated by the movement of said focal plane shutter for shifting said auxiliary shutter.

In testimony whereof I have affixed my signature.

FREDERICK W. MUELLER.

Copies of this patent may be obtained for five cents each, by addressing the "Commissioner of Patents, Washington, D. C."